(No Model.)
W. A. C. OAKS.
SEED SOWER.
No. 397,606. Patented Feb. 12, 1889.
Fig: 1.
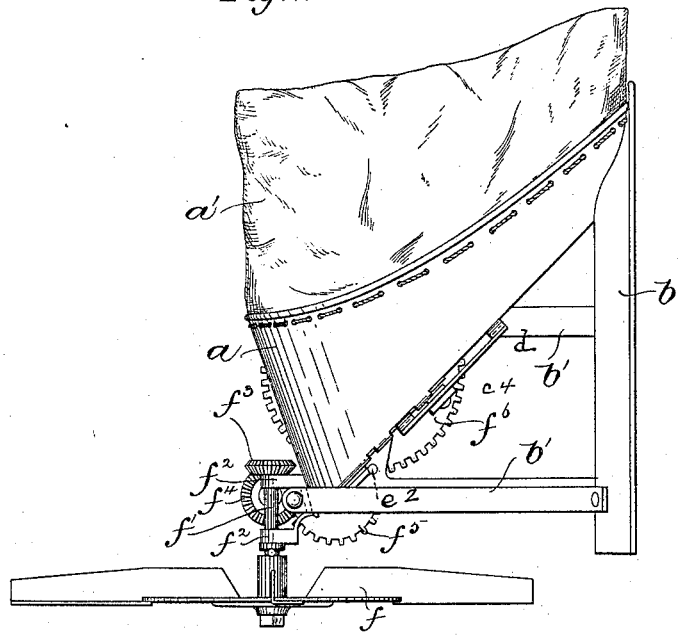
Fig: 2.
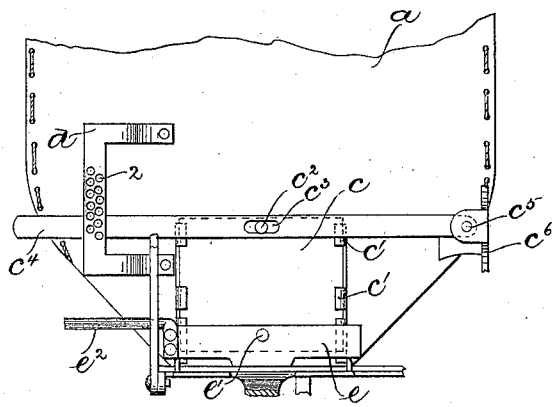
Witnesses.
Fred. L. Greenleaf
Frederick L. Emery.
Inventor.
William A. C. Oaks,
by Crosby & Gregory
Attys.

UNITED STATES PATENT OFFICE.

WILLIAM A. C. OAKS, OF ANTRIM, NEW HAMPSHIRE, ASSIGNOR TO THE GOODELL COMPANY, OF SAME PLACE.

SEED-SOWER.

SPECIFICATION forming part of Letters Patent No. 397,606, dated February 12, 1889.

Application filed October 23, 1888. Serial No. 288,906. (No model.)

*To all whom it may concern:*

Be it known that I, WILLIAM A. C. OAKS, of Antrim, county of Hillsborough, State of New Hampshire, have invented an Improvement in Seed-Sowers, of which the following description, in connection with the accompanying drawings, is a specification, like letters on the drawings representing like parts.

This invention has for its object to improve the construction of seed-sowers.

In accordance with this invention, a hopper is fastened to a suitable frame made portable, the hopper having at its lower end an opening provided with an adjustable valve. A rotatable distributer is fixed to a shaft below the said opening of the hopper to distribute the seed issuing from the opening. A hand-crank and suitable connecting-gearing is provided to rotate the said distributer. The valve employed is designed to uncover the opening more or less, as desired, and an auxiliary valve is provided, which is designed to uncover the opening left by the main valve more or less at one or the other side, so that the seed may issue from the opening at one side of the opening more than the other, if desired. The auxiliary valve is operated when there is a wind blowing, so that more seed can be delivered on one side than the other to effect an equal distribution.

Figure 1 shows in side elevation a seed-sower embodying this invention; Fig. 2, a partial rear view of the hopper, showing the main and auxiliary valves.

The hopper $a$, of any suitable size and shape, is secured to a frame composed of a back plate, $b$, and the supporting-arms $b'$. The hopper $a$ is continued by a flexible wall, $a'$, that it may contain a large quantity of seed. The back plate, $b$, is designed to have connected with it suitable straps, by which the apparatus may be fastened to the operator to be carried about.

The hopper $a$ has at its lower end an opening, which has a quadrangular plate, $c$, covering it. (See Fig. 2.) This plate $c$ is adapted to slide on suitable guides or clips, $c'$, and has projecting from its under side a pin, $c^2$, which enters a slot, $c^3$, formed in a hand-lever, $c^4$, pivoted at $c^5$ to the bracket or frame $c^6$. The plate $c$ is thereby made movable by means of the hand-lever $c^4$, and serves as a valve to open and close the opening or discharge-orifice of the hopper $a$.

A loop-like guide, $d$, is riveted or otherwise secured to the rear side of the hopper $a$, which serves as a guide-loop for the hand-lever $c^4$, said loop being provided with numerous holes, 2, in which a pin may be placed to hold the lever $c^4$ in a given position. Another plate, $e$, is pivotally connected by a pin, $e'$, to the plate $c$ at its lower end, said plate $e$ having a handle-bar, $e^2$, by which it may be turned on its pivot $e'$. This plate $e$ forms a continuation of the plate $c$, and by moving it on its pivot the opening left by the plate $c$ may be made wider at one side than at the other, so that the discharge of seed from one side of the orifice may be greater than at the other, such a discharge being found necessary in sowing seed when the wind blows.

The seed passing through the orifice of the hopper falls upon a distributer, $f$, of any usual construction, secured to a shaft, $f'$, mounted in a bracket or frame, $f^2$. The shaft $f'$ has fixed to it a beveled gear, $f^3$, which meshes with a beveled gear, $f^4$, fixed to a shaft, to the opposite end of which is secured a pinion, (not shown,) which engages a toothed wheel, $f^5$, upon the face or hub of which is formed a toothed surface or pinion, which engages the drive-wheel $f^6$, to which is fastened a hand-crank.

By rotating the drive-wheel $f^6$ it will be seen that the gearing is so multiplied that the distributer $f$ will be rotated very rapidly.

By the apparatus herein described the seed may be delivered in greater or less quantities, and even in a high wind, and equally distributed.

I claim—

1. In a seed-sower, the hopper $a$, having an exit-orifice, and the rotatable distributer for scattering the seed delivered from the said orifice, combined with a valve-plate movable to vary the width of the said orifice from end to end, substantially as described.

2. In a seed-sower, the hopper $a$, having an exit-orifice, and the rotatable seed-distributer, combined with a movable valve-plate for the said orifice, and the pivoted valve-plate e thereon, for varying the width of the orifice from end to end unequally, substantially as described.

3. In a seed-sower having an exit-orifice, the rotatable seed-distributer, combined with the sliding valve-plate c and hand-lever for moving it, and the movable plate e and hand-lever for moving it at an angle with relation to the lower edge of the said valve-plate, substantially as and for the purposes set forth.

In testimony whereof I have signed my name to this specification in the presence of two subscribing witnesses.

WILLIAM A. C. OAKS.

Witnesses:
H. A. HURLIN,
C. S. ABBOTT.